Figure 3:
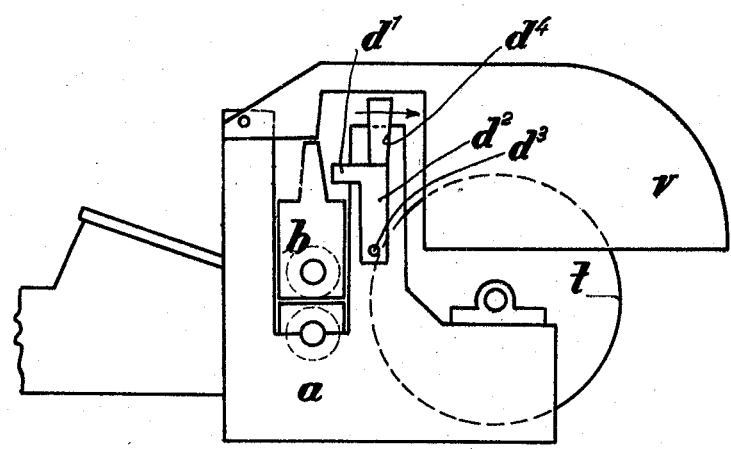

Aug. 19, 1930. A. SCHMIDT 1,773,499
CHAFF CUTTER
Filed July 12, 1927 2 Sheets-Sheet 1
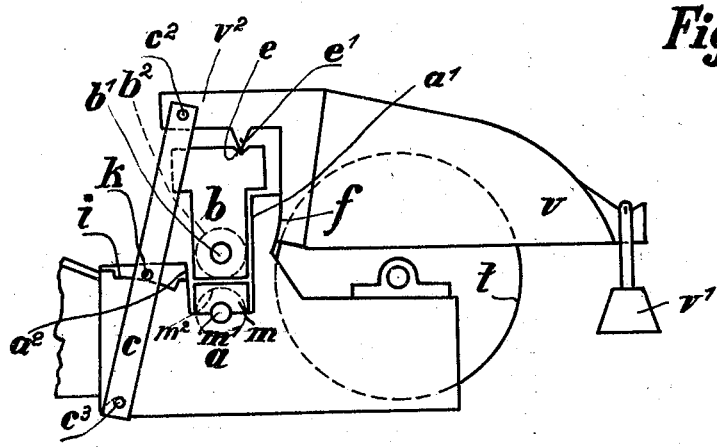
Fig.1.
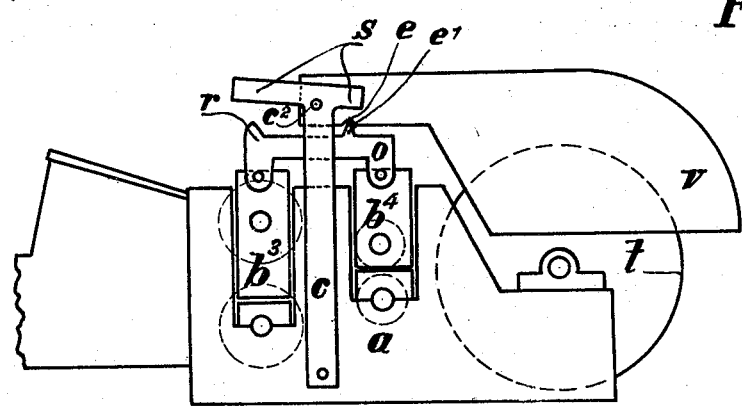
Fig.5.
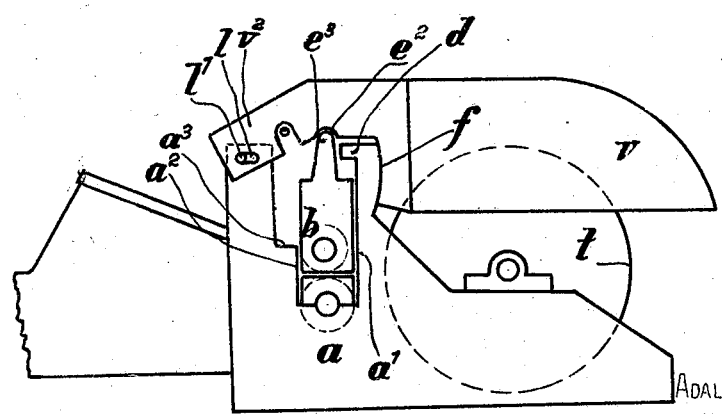
Fig.2
ADALBERT SCHMIDT
INVENTOR
By 
his ATTY

ADALBERT SCHMIDT
INVENTOR

Patented Aug. 19, 1930

1,773,499

UNITED STATES PATENT OFFICE

ADALBERT SCHMIDT, OF OSTERODE, GERMANY

CHAFF CUTTER

Application filed July 12, 1927, Serial No. 205,223, and in Germany July 15, 1926.

My invention relates to chaff cutters.

In the hitherto known chaff cutters of the drum and wheel type it is impossible to remove or introduce the upper and lower roller unit, i. e. the upper and lower shaft together with the rollers and gear wheels, from or into the machine without first removing some screws or other fastening members.

The object of my invention is to enable the removal or insertion of the upper and lower roller units from or into chaff cutters without the necessity of manipulating any fastening or fixing members. I attain this object substantially by making provisions that in a system, which consists of a loading device for the upper roller, its guiding arrangement and means effecting the limitation of its stroke, the load and the limiting means may be removed without manipulating any attaching members.

This possibility of the free and unrestricted removal of the roller units has the advantage that in case of the feed channel becoming choked the accumulation of the straw or fodder may easily and quickly be removed. Equally simple is the clearing of the machine when very damp materials are being treated because the rollers are freely accessible after the removal of the unit. A further advantage of my improved machine is that the machine may easily be assembled and dismounted and worn parts of the roller units, such as bearings and gear wheels, may easily be exchanged.

In the drawings affixed to this specification and forming part thereof a number of embodiments of my invention are illustrated diagrammatically.

In the drawing is:—

Figure 4:
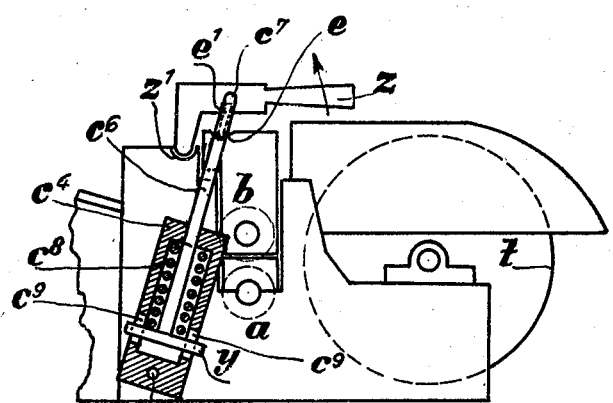
Figure 6:
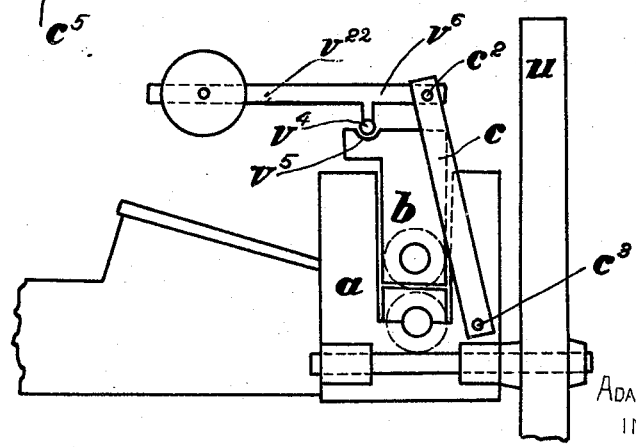

Fig. 1, a side-elevation of a drum chaff cutter in which the stroke of the upper drum is limited by rocking levers provided between the loading means and the machine frame, Fig. 2, a side-elevation of a modified construction of a drum chaff cutter in which the limitation is effected either by a stop upon the machine framing or by pivoted levers disposed between the loading means and the bearing of the upper feed roller, Fig. 3, a further modification of a drum-type chaff cutter in which the limitation is effected by adjustable stops upon the machine framing, Fig. 4, a still further modification of a drum chaff cutter in which spring-controlled rocking levers serve simultaneously for loading and limiting the stroke of the roller bearings, Fig. 5, another modification corresponding substantially with that illustrated in Fig. 1, but for a drum chaff cutter with twin rollers, and Fig. 6, a modification with a rocking lever limiting the stroke of the upper roller for a disc-type chaff cutter.

Like parts are indicated by like letters of reference throughout all the figures of the drawings.

Referring to the drawings $a$ is the framing of the machine, $b$ the bearing and $b^1$ the shaft of the upper feed roller $b^2$, $m$ the bearing and $m^1$ the shaft of the lower feed roller $m^2$. The knife cylinder is indicated by the reference letter $t$. The drive of the rollers $b^2$ and $m^2$ and of the knife cylinder $t$ is effected in the conventional manner and has therefore not been shown in the drawings.

Referring particularly to Fig. 1 of the drawings it will be observed that the loading of the bearing $b$ for the upper feed roller is effected by means of a lever $v$. This lever is preferably designed as hood or guard for the knife drum, as shown. The mutual support of the loading lever $v$ and of the bearing of the upper roller is here quite free and effected by a notch $e$ and knife edge $e^1$. By raising the loading lever $v$ the knife edge and the notch are thrown out of engagement. An accidental disengagement of the said mutual support cannot take place because this tendency is counteracted by the weight of the loading lever. The lever $v$ may be further loaded by an additional weight $v^1$ or a pressure or tension spring.

The bearing $b$ of the upper roller is guided by jaw-like members $a^1$ and $a^2$ of the framing $a$. If for constructional reasons one of the side members, such as the member $a^2$ in Fig. 1, is made very low, the tipping over of the bearing $b$ of the upper roller may be prevented by a curved guide $f$ formed on the one hand by a convex portion of the machine framing $a$ and on the other hand by a concave portion on the loading lever $v$.

The open guiding standard for the bearing $b$ of the upper roller is closed by a suitable device adapted to limit the stroke of the upper roller $b^2$. Said limiting device consists in Fig. 1 of rocking levers $c$ provided at both sides of the cutter and which at their lower ends are pivoted on the framing $a$ at $c^3$ and at their upper ends at jaw-like projections $v^2$ of the loading lever $v$ by means of a transverse rod $c^2$ which connects the pair of levers $c$ at their upper ends with each other. When the bearing $b$ of the upper roller moves upwards its ascent is limited by the transverse rod $c^2$.

In order to prevent the rocking lever $c$ from dropping down when the loading lever $v$ is raised, a pin $k$ is provided in the lever $c$ which is guided upon a rail or in a recess $i$ of the machine framing $a$.

When it is desired to remove the upper and lower roller units the load is removed from the upper roller by lifting the loading lever $v$. The supporting device (notch $e$ and knife edge $e^1$) then becomes inoperative. The rocking levers $c$ may now be swung sideways to such an extent that the transverse rod $c^2$ is located beyond the reach of the bearing $b$ of the upper roller. The limiting device as well as the guiding device are then out of the way and permit the free lifting out of the roller units.

In Fig. 2 of the drawings the guiding standard for the bearing $b$ of the upper roller consists at one side of a cheek $a^1$ provided at the upper end with a nose like stop $d$ for arresting the bearing of the upper roller. The other cheek $a^2$ is at its top at $a^3$ recessed in such a way that by swinging the bearing $b$ sideways it may be lifted freely out of the open guide. In order to prevent the bearing of the upper roller from swinging away from the guide cheek $a^2$ accidentally there is provided a concave notch $e^2$ and convex projection $e^3$ and the curved guide $f$ as in Fig. 1. The cheeks $v^2$ of the lever $v$ are journaled upon pins $l^1$ on the machine frame $a$ by means of slots $l$.

In Fig. 3 of the drawings the limiting device consists of a stop $d^1$ projecting laterally from a lever $d^2$ fulcrumed to the machine frame $a$ at $d^3$ and which may be swung into or out of the path of the upper roller bearing $b$.

After relieving the upper roller of its load by raising the hood $v$ the stop nose $d^1$ is swung aside and the rollers may now be lifted out of the machine.

In the modification illustrated in Fig. 4 of the drawings the rocking lever serving as limiting device is spring-controlled and at the same time forms the load on the top roller. For this purpose the rocking lever consists of a casing $c^4$ pivoted to the machine framing $a$ at $c^5$ and a rod $c^6$ slideable within said casing and pivoted at its upper end at $c^7$ to a handle $z$. The rod $c^6$ is controlled by a spring $c^8$ which is compressed between a transverse rod $y$ on rod $c^6$ and the top of the casing $c^4$ and thus has the tendency to pull the rod $c^6$ downwards with a desired force. The transverse rod $y$ is adapted to slide in longitudinal slots $c^9$ of the casing $c^4$. The handle $z$ is adapted to be swung upwards in the direction of the arrow around the pan-like bearing $z^1$ and is drawn with a knife edge $e^1$ into a notch $e$ of the upper roller bearing $b$ under the action of the spring $c^8$. It is obvious that the loading of the top roller as well as the limitation of the movement of the bearing of the roller is effected by the spring $c^8$ and by the transverse rod $y$ and the slots $c^9$.

Fig. 5 of the drawings shows my improvements applied to a four roller machine. The two upper roller bearings $b^3$ and $b^4$ are connected by bridge-like members $r$ and the loading lever $v$ designed as guard or hood for the knife drum is pivoted to rocking levers $c$ at $c^2$ and supported by means of a knife edge $e^1$ and a notch $e$, the knife edge $e^1$ being provided upon the bridge member $r$. The rocking levers $c$ are provided with lateral extensions $s$ at their upper ends with which contact the bearings of the upper rollers through the agency of the bridge $r$ when the bearings ascend, for the purpose of limiting their ascent. For lifting out the roller units the hood $v$ and the oscillating levers $c$ are swung sideways so that the guide standard for the bearing blocks of the roller becomes freely accessible for the said purpose.

In Fig. 6 of the drawings my improvement is shown as applied to a chaff cutter of the wheel type. $u$ is the chaff cutter wheel of known construction. The loading lever $v^{22}$ rests with a roller or ball head $v^4$ in a pan $v^5$ of the bearing $b$ of the upper roller. The limitation of the stroke of the upper roller is in a similar manner as in Fig. 1 effected by the transverse rod $c^2$ of the rocking levers $c$, which are pivoted to the machine framing $a$ at $c^3$ and by means of the transverse rod $c^2$ to a tail $v^6$ of the loading lever $v^{22}$. After raising the lever $v^2$ the bearing $b$ together with its roller may freely be lifted out of the machine.

Various changes and modifications may be made without departing from the spirit of my invention and I desire therefore that only such limitations be placed thereon as are imposed by the prior art.

I claim as my invention:—

1. In a chaff cutter, in combination, an upper feed roller adapted to be raised and lowered, a standard open at the top for guiding the bearings of said roller, a loading mechanism for depressing the said bearings, and a device for limiting the upward motion of said bearings, the standard, loading mechanism and limiting device being so located in relation to each other that by raising the load the said bearing is set free for removal.

2. In a chaff cutter, in combination, a vertically reciprocatable upper feed roller, a standard open at the top for guiding the bearings of said roller, a loading mechanism for depressing the said bearings in said standard, and means for limiting the ascent of said bearings, said loading mechanism consisting of a loading lever supported openly in relation to said standard and being adapted to be raised, and said limiting means being adapted to set free the said bearings after the raising of the loading lever.

3. In a chaff cutter, in combination, an upper feed roller adapted to be raised and lowered, a standard open at the top for guiding the bearings of said roller, a loading mechanism for holding said bearings down in said standard, and a device for limiting the ascent of said bearings, said loading mechanism being formed by a safety hood for the knife drum open in relation to said standard and adapted to be raised, said limiting device being adapted to set said bearings free after the raising of said hood.

4. In a chaff cutter, in combination, an upper feed roller adapted to be raised and lowered, a standard open at the top for guiding the bearings of said roller, a loading mechanism for said roller open in relation to said standard and adapted to be raised, and a device for limiting the upward stroke of said roller consisting of a stop adapted to limit the upward stroke of said roller in the operative position of said loading mechanism and to set said roller free after removal of the load.

5. In a chaff cutter, in combination, an upper feed roller, a standard open at the top for guiding the bearings of said roller, a loading device open in relation to said standard and adapted to be raised, and a device for limiting the upward stroke of said roller consisting of a movable stop adapted to limit the upward stroke of said bearings when the loading device is in its operative position and to set them free after the load has been removed from said roller.

6. In a chaff cutter, in combination, an upper feed roller adapted to be raised and lowered, a standard open at the top for guiding the bearings of said roller, a loading device for depressing said bearings in said standard, and a device for limiting the ascent of said bearings in said standard, said loading device consisting of a lever resting upon the upper bearing in the manner of the beam of a pair of scales and acting with one arm as load and being pivoted at the other arm, the said limiting device being adapted to set said bearings free after said loading lever has been raised.

7. In a chaff cutter, in combination, an upper feed roller adapted to be raised and lowered, a standard open at the top for guiding the bearings of said roller, a loading device open in relation to said standard and adapted to be raised, and a device adapted to limit the upward stroke of said roller consisting of a rocking stop located in the path of said roller when said loading device is in the operative position and adapted to be moved out of the path of the roller when the load is raised.

8. In a chaff cutter, in combination, an upper feed roller adapted to be raised and lowered, a standard open at the top for guiding the bearings of said roller, a loading lever for holding said roller down resting removably upon said bearing and pivoted upon a rocking pin, said pivot pin being so arranged that it limits the upward stroke of said bearing in the operative position of said loading lever and adapted to be moved out of the limiting position when said loading lever is raised.

9. In a chaff cutter, in combination, an upper roller adapted to be raised and lowered, a standard for the reception of the bearings of said roller open at the top, a loading lever for holding said roller down resting upon the bearing of said roller and adapted to be lifted out of engagement with it, pivoted arms hinged to the free end of said lever, the connecting joint being adapted to limit the ascent of said roller when said loading lever is in the operative position and to be moved out of the limiting position when said loading lever is raised out of engagement with said bearing.

10. In a chaff cutter, in combination, an upper feed roller adapted to be raised and lowered, a standard for the bearings of said roller open at the top, a loading lever for holding said roller down resting removably upon the bearing of said roller, arms pivoted to the cutter frame and hinged to the free end of said lever, the connecting joint being adapted to limit the ascent of said roller when said loading lever is in the operative position and to be moved out of the limiting position when said loading lever is raised out of engagement with said bearing.

11. In a chaff cutter, in combination, an upper feed roller adapted to be raised and lowered, a standard for the bearings of said roller open at the top, a scale-beam like loading lever resting upon the bearing of said roller designed at one end as safety hood for the knife drum and hinged at the other end to rocking levers pivoted to the cutter framing, the connecting joint being adapted to limit the upward motion of said bearing when said loading lever is in the operative position and to be moved out of the limiting position after the loading lever has been raised out of engagement with said bearing.

In testimony whereof I have affixed my signature.

ADALBERT SCHMIDT.